United States Patent [19]

Ogura

[11] Patent Number: 4,864,113
[45] Date of Patent: Sep. 5, 1989

[54] INFORMATION MEMORY SYSTEM FOR READING INFORMATION FROM A MOVING RECORDING MEDIUM

[75] Inventor: Nobuo Ogura, Tokyo, Japan

[73] Assignee: Canon Kabushiki Kaisha, Tokyo, Japan

[21] Appl. No.: 936,598

[22] Filed: Dec. 1, 1986

[30] Foreign Application Priority Data

Dec. 4, 1985 [JP] Japan .................. 60-272805

[51] Int. Cl.$^4$ .......................................... G06K 13/00
[52] U.S. Cl. .................... 235/477; 235/436; 369/124
[58] Field of Search ............... 235/476, 477, 480, 436; 369/124, 174; 360/2

[56] References Cited

U.S. PATENT DOCUMENTS 3,946,202  3/1976  Taniguchi et al. ............ 235/477 X
3,961,315  6/1976  Yokoyama ..................... 369/124 X Primary Examiner—David L. Trafton
Attorney, Agent, or Firm—Fitzpatrick, Cella, Harper & Scinto

[57] ABSTRACT

An information memory system suitable for a recording medium such as an optical card which reciprocates. This memory system includes: a reading apparatus for reciprocating the recording medium and reading out the information recorded on the recording medium; an auxiliary memory apparatus different from the recording medium; and a managing apparatus for managing the reading apparatus and the auxiliary memory apparatus. The reading apparatus transfers the information read out of the recording medium to the managing apparatus, and the managing apparatus stores the information transferred from the reading apparatus to the auxiliary memory apparatus while new information is being read out. The reading apparatus has a memory for temporarily storing the information read out of the recording medium and transfers the information from the memory to the managing apparatus when the recording medium is reversed. With this system, the read-out information can be efficiently transferred to the host computer side and can be processed. Therefore, the idle time of the host side can be extremely effectively used.

8 Claims, 13 Drawing Sheets

INFORMATION MEMORY SYSTEM FOR READING INFORMATION FROM A MOVING RECORDING MEDIUM

BACKGROUND OF THE INVENTION

1. Field of the Invention

The present invention relates to an information memory system suitable for a recording medium which reciprocates.

2. Related Background Art

In recent years, small-sized portable card-shaped recording media have been considered. In the case of reading out the information recorded on such a card-shaped recording medium and processing the information by a host computer and the like, there is the drawback that when the amount of information recorded on the card is large, it takes a long time until the processes to be executed on the host side are started.

SUMMARY OF THE INVENTION

It is an object of the present invention to eliminate the foregoing drawback.

Another object of the invention is to improve an information memory system.

Still another object of the invention is to provide an information memory system which can efficiently transfer the information read out of a recording medium to the host side and can process the information.

The above and other objects and features of the present invention will become apparent from the following detailed description and the appended claims with reference to the accompanying drawings.

DETAILED DESCRIPTION OF PREFERRED EMBODIMENTS

An embodiment of the present invention will now be described in detail hereinbelow with reference to the drawings.

Figure 1:
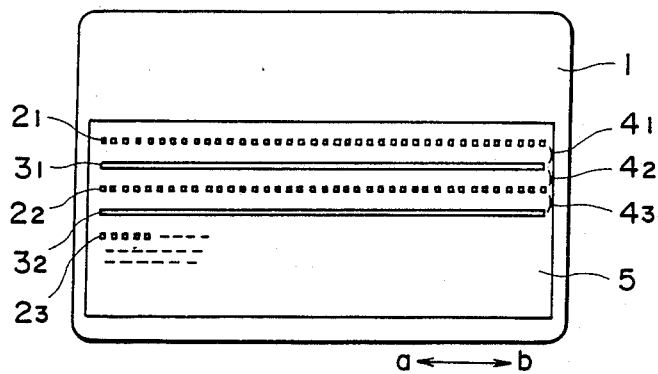
FIG. 1 is a schematic plan view of an optical card which can be applied to the present invention.

FIG. 1 is a schematic plan view of an optical card which can be applied to the present invention. In the diagram, clock tracks $2_1, 2_2, 2_3, \ldots$ and tracking tracks $3_1, 3_2, \ldots$ are alternately formed on the optical card 1 at regular intervals. Each of the clock tracks $2_1, 2_2, \ldots$ is intermittently formed like a broken line and a clock signal is recorded on the clock track. Each of the tracking tracks $3_1, 3_2, \ldots$ is continuously formed like a line. Each of recording tracks $4_1, 4_2, 4_3, \ldots$ for recording data is formed between each clock track and each tracking track.

Figure 2:
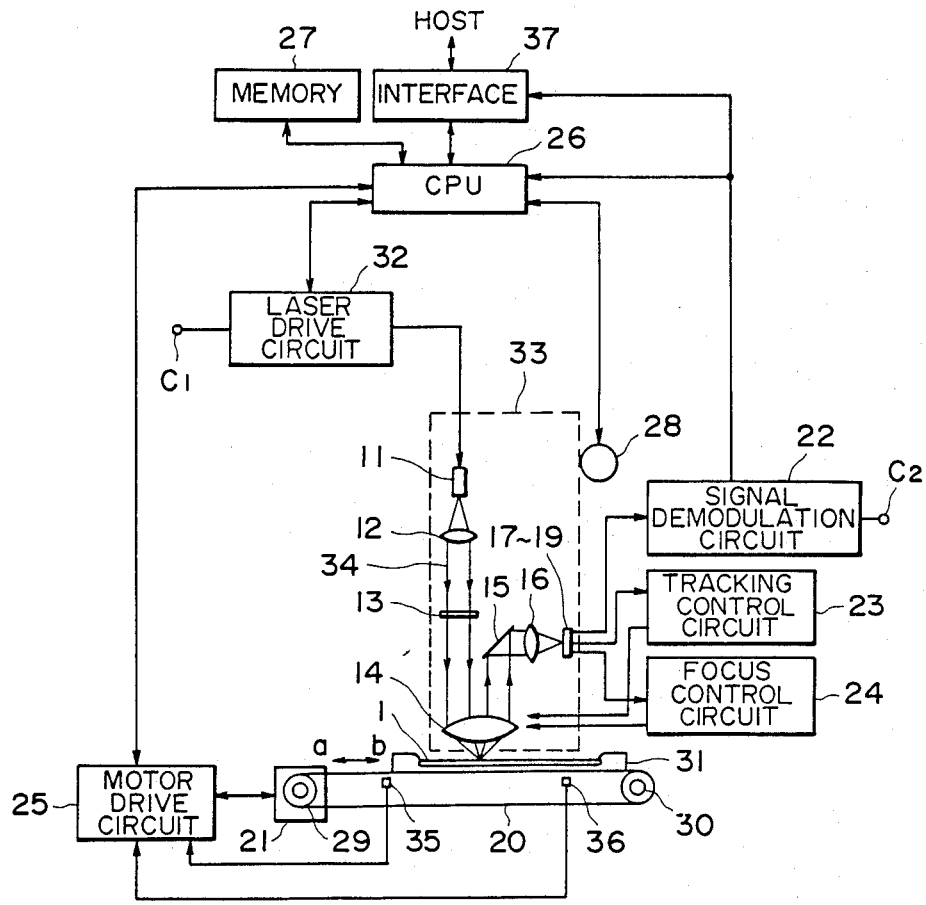
FIG. 2 is a block diagram showing the constitution of an optical card reader/writer.

FIG. 2 is a block diagram showing the constitution of an information memory apparatus in this embodiment.

The optical card 1 is placed on a card holder 31 fixed onto an endless belt 20. The belt 20 is installed between pulleys 29 and 30 and is moved in the direction indicated by an arrow a or b by a motor 21. The optical card 1 is also moved in the direction of a or b in response to the movement of the belt 20.

An optical head 33 comprises: a semiconductor laser 11; a collimator lens 12; a diffraction grating 13; an objective lens 14; a reflection mirror 15; an objective lens 16; and photo-detectors 17 to 19.

The signals detected by the photo-detectors 17 to 19 are sent to a signal demodulation circuit 22, a tracking control circuit 23, and a focus control circuit 24. The focus control circuit 24 and tracking control circuit 23 move the objective lens 14 in the direction of an optical axis of the lens 14 and a direction perpendicular to the optical axis, thereby executing auto-focusing (AF) and auto-tracking (AT).

A stepping motor 28 moves the optical head 33 in a direction perpendicular to the surface of drawing paper, thereby moving the irradiating position of an optical beam and performing an operation to access (seek) the track. The motor 21 is controlled by a motor drive circuit 25 and moves and stops the optical card. Sensors 35 and 36 for detecting the reverse position of the card holder 31 are constituted by microswitches, photointerrupters, or the like. When the card holder 31 is detected by the reverse sensors 35 and 36, detection signals are sent to the motor drive circuit 25 and a CPU 26 allows the motor 21 to rotate in reverse. Numeral 27 denotes a memory and 37 is an interface for controlling the input and output of signals with a host computer side (not shown).

Figure 3:
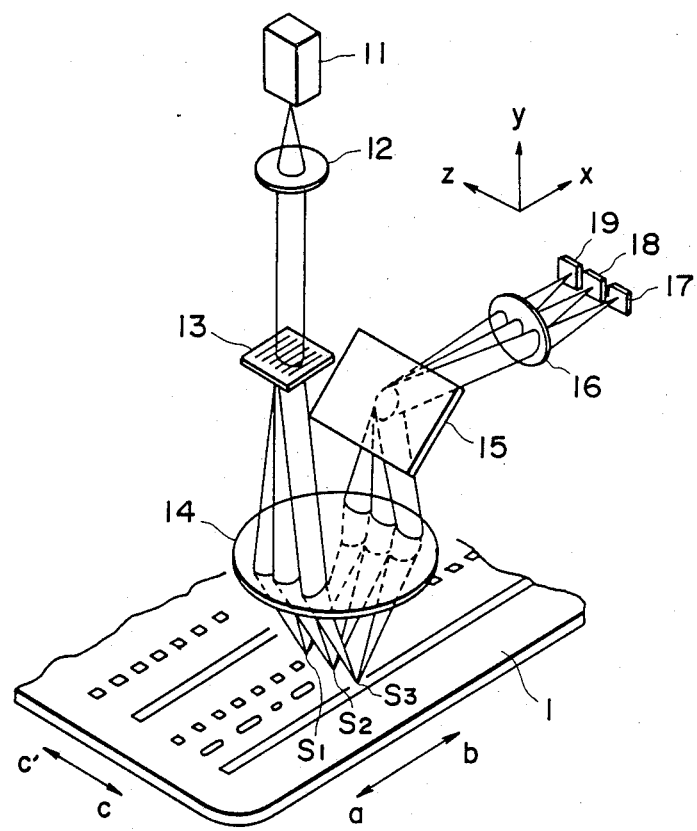
FIG. 3 is a perspective view showing the constitution of a part of the optical card reader/writer.

FIG. 3 is a perspective view showing a part of the constitution of a data recording/reproducing apparatus embodying the present invention. A beam emitted from the light source 11 such as semiconductor laser or the like is converted into a parallel beam by the collimator lens 12 and divided into three beams by the diffraction grating 13. These beams are formed as images onto the optical card 1 through the objective lens 14, so that beam spots $S_l$, $S_2$, and $S_3$ are formed, respectively. The optical card 1 is moved in the direction of the arrow a or b by the drive means 25 and scanned by the beam spots in the longitudinal directions of the tracking tracks and clock tracks.

The reflected light of the beam spots $S_l$ to $S_3$ pass through the objective lens 14 again and are reflected by the mirror 15 and projected through a condenser lens 16 onto the photo-detectors 17 to 19 disposed on the focal plane, respectively. These photodetectors are arranged in the z direction shown in FIG. 3. The whole optical system is moved in the directions of arrows c and c' by the stepping motor 28.

Figure 4:
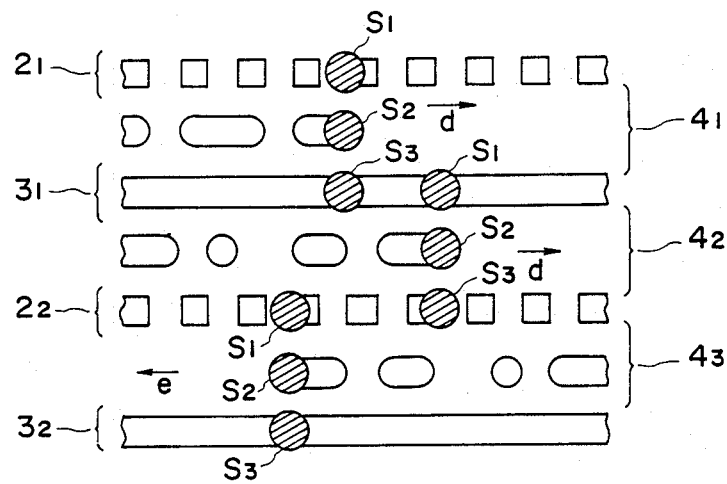
FIG. 4 is an enlarged diagram of the recording surface of the optical card for explaining the operation to record data.

FIG. 4 is an enlarged diagram of the recording surface of the optical card for explaining the operation to record data by use of the apparatus of FIG. 3. First, in the case of recording data onto the recording track $4_1$, the spots $S_I$ to $S_3$ are irradiated onto the clock track $2_1$, recording track $4_1$, and tracking track $3_1$, respectively. These spots are scanned in the direction of an arrow d when the optical card 1 is moved in the direction of a as mentioned above. The reflected light from the spot $S_I$ enters the photo-detector 17, so that the clock signal is reproduced. The reflected light from the spot $S_3$ enters the photo-detector 19 and the tracking signal is detected by a well-known method called a push-pull method or the like. The data is recorded in the direction of d by the spot $S_2$. When the optical card is returned in the direction of an arrow e, the recorded data is read out and verified to see if an error is detected or not. The data is also similarly recorded onto the other recording tracks.

Figure 5:
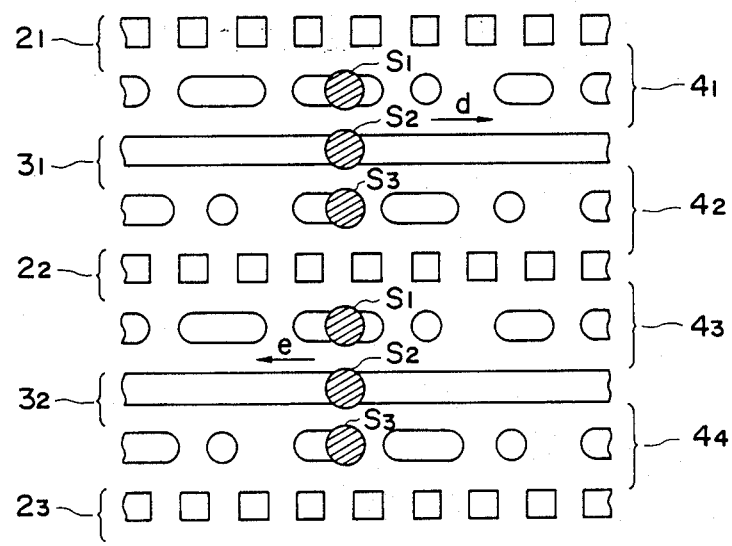
FIG. 5 is an enlarged diagram of the recording surface of the optical card for explaining the operation to reproduce the data.

FIG. 5 shows the operation when the data recorded as mentioned above is reproduced by the same apparatus.

The spots $S_I$ to $S_3$ are irradiated onto the recording track $4_1$, tracking track $3_1$, and recording track $4_2$ and scan onto the optical card 1 in the direction of the arrow d when the optical card is moved in the direction of a, respectively. While the tracking signal is detected by the photo-detector 18 corresponding to the spot $S_2$, the data recorded on the recording tracks $4_1$ and $4_2$ are simultaneously reproduced on a two-line unit basis by the photo-detectors 17 and 19 corresponding to the spots $S_I$ and $S_3$. Next, the spots $S_I$ to $S_3$ are irradiated onto the recording track $4_3$, tracking track $3_2$, and recording track $4_4$ and the optical card is moved in the direction of b and the respective spots are scanned in the direction of e. While the tracking signal is detected by the photo-detector 18, the data recorded on the recording tracks $4_3$ and $4_4$ is simultaneously reproduced by the photo-detectors 17 and 19. By repeating the foregoing operations, data recorded as a plurality of lines can be read out at a high speed on a two-line unit basis without skipping a part of the data.

Figure 6:
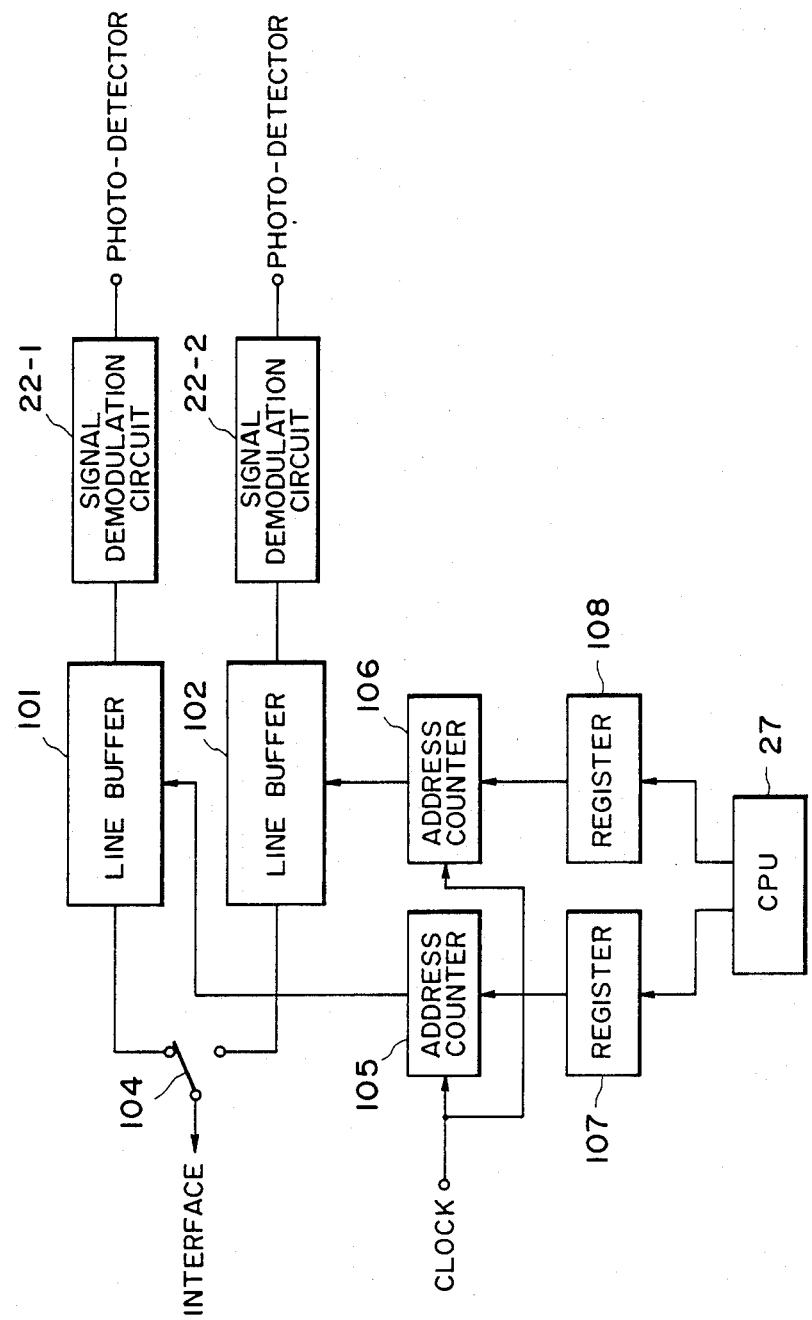
FIG. 6 is a block diagram showing a constitution to reproduce and transfer the data from the optical card.

Since the system for simultaneously reading out the data of two lines is used in this embodiment, two line buffers are prepared as shown in FIG. 6. For example, in FIG. 5, the data read out of the recording track $4_1$ is demodulated by a demodulation circuit 22-1 and stored in a line buffer 101. The data read out of the recording track $4_2$ is demodulated by a demodulation circuit 22-2 and stored in a line buffer 102. A switch 104 is sequentially switched, thereby allowing the data stored in the line buffers to be output to the interface 37. When the data is stored in the line buffers 101 and 102, the storing operations are respectively controlled by address counters 105 and 106. The address counters 105 and 106 count up and down by the clock and preset values are set by registers 107 and 108. In the case of reading the data in the direction of d, since the scanning is performed in the same direction as the writing direction, the address counter counts up. However, when the data is read out in the direction of e, since the scanning is performed in the direction opposite to the writing direction, the data is read out in the reverse direction and is also reversely stored into the line buffer. When the data is read out of the line buffer, the address counter counts down from the preset value, thereby to the storing direction, in the line buffer. Thus, data is output in accordance with the correct order. In addition to the foregoing method whereby the count value is decreased from the preset value, it is also possible to use the method whereby the increased value is held and the count value is decreased from this value.

When the data is stored in the line buffer, it is also possible to use the method whereby in the forward operation, the data is stored in the line buffer from the head address and the storage address is sequentially increased, while in the returning operation, the data is stored in the line buffer from the last address and the storage address is sequentially decreased. Therefore, when the data is read out of the line buffer, it is sufficient to always read the data from the head address.

Figure 7:
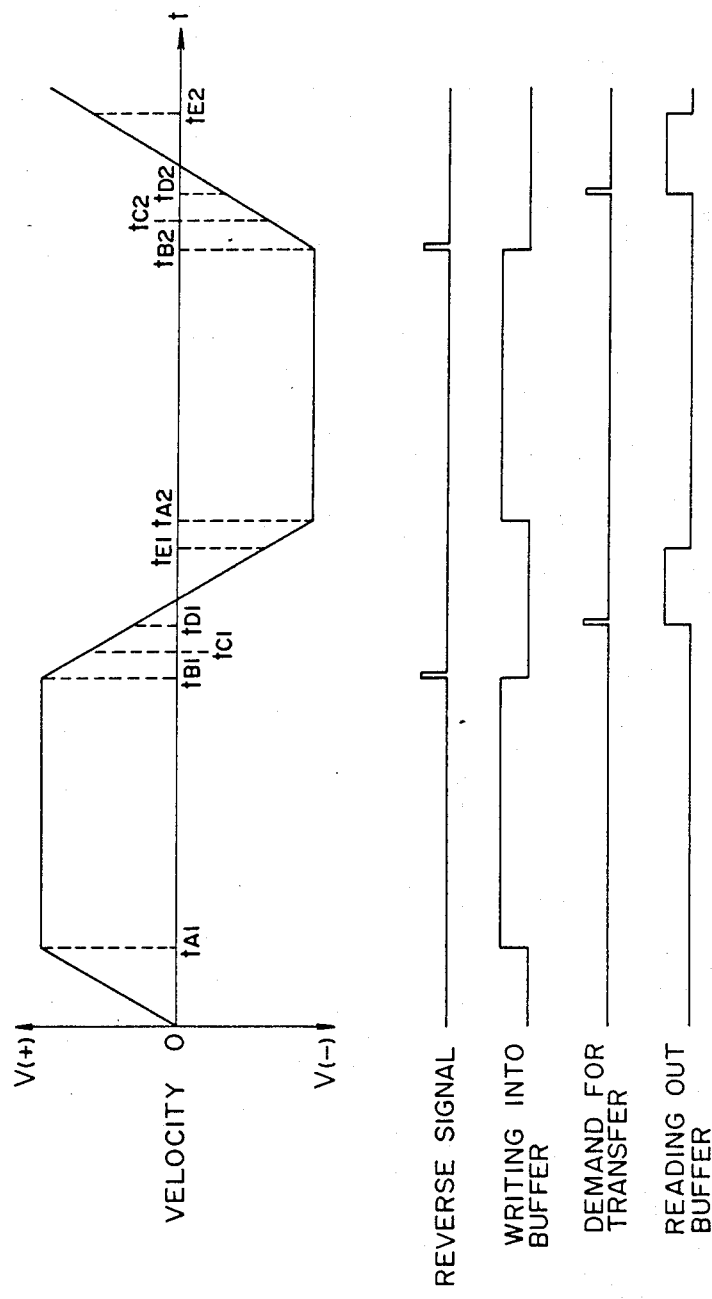
FIG. 7 is a time chart when data is reproduced.

FIG. 7 is a time chart showing the operation of the invention when the data is read out from the optical card and transferred to the host computer side.

First, a data reading command is input from the host computer side. When the moving velocity of the card becomes constant and the optical head reaches over the recording area, the data is simultaneously read out from the card on a two-track unit basis by the foregoing method. The readout data is then demodulated and sequentially stored into the buffer memories (point $t_{AI}$). At this time, the line buffers and address counters are cleared. The content of the data to be stored into the line buffers includes: preamble data to perform the PLL control; a sync mark to search the beginning of the data; recording data; and postamble data to perform the PLL control when the data is read out in the opposite direction. The optical head reaches out of the recording area and the writing of the data into the buffer memories is finished (point $t_{BI}$). The content of the buffer memory is read and the sync mark is detected, thereby allowing the apparatus to be ready to soon transfer the recording data (point $t_{CI}$). In this state, the apparatus waits for a signal indicative of demand for transfer which is output from the interface. When the data transfer is requested, the recording data is read out of the buffer memory 101 and the recording data is subsequently read out of the buffer memory 102 and the direct transfer of the data into the memory 5 on the host computer side is started (point $t_{DI}$). All of the recording data in the buffer memory is read out and the data transfer is finished (point $t_{EI}$). When the card is returned, the recording data is also transferred in a manner similar to the above when the card is moved in reverse.

Figure 8:
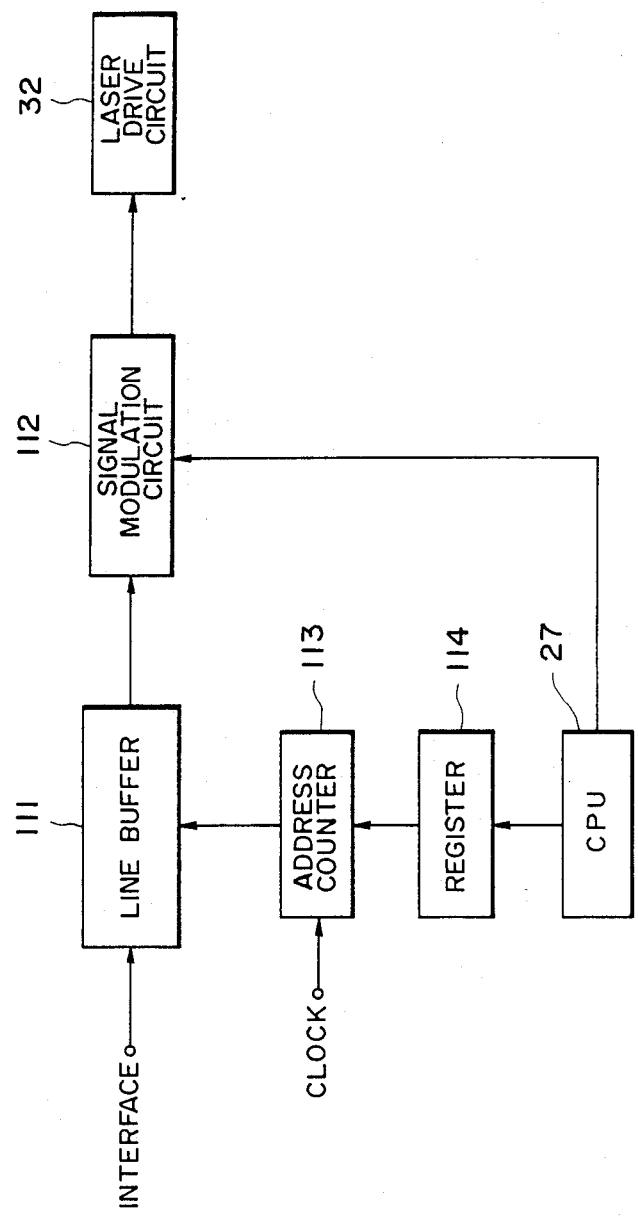
FIG. 8 is a block diagram showing a constitution to record data onto the optical card.

FIG. 8 is a block diagram showing part of the invention when data is recorded onto the optical card and shows a detailed diagram of a part of the block diagram of FIG. 1. The recording data is sent from the host side and stored in a buffer memory 111. This data is modulated by a signal modulation circuit 112 and sent to a laser drive circuit 32 and recorded onto the card by a laser beam. Similar to the case of the reproduction mentioned above, the writing of the data into the buffer memory is controlled by the address counter.

Figure 9:
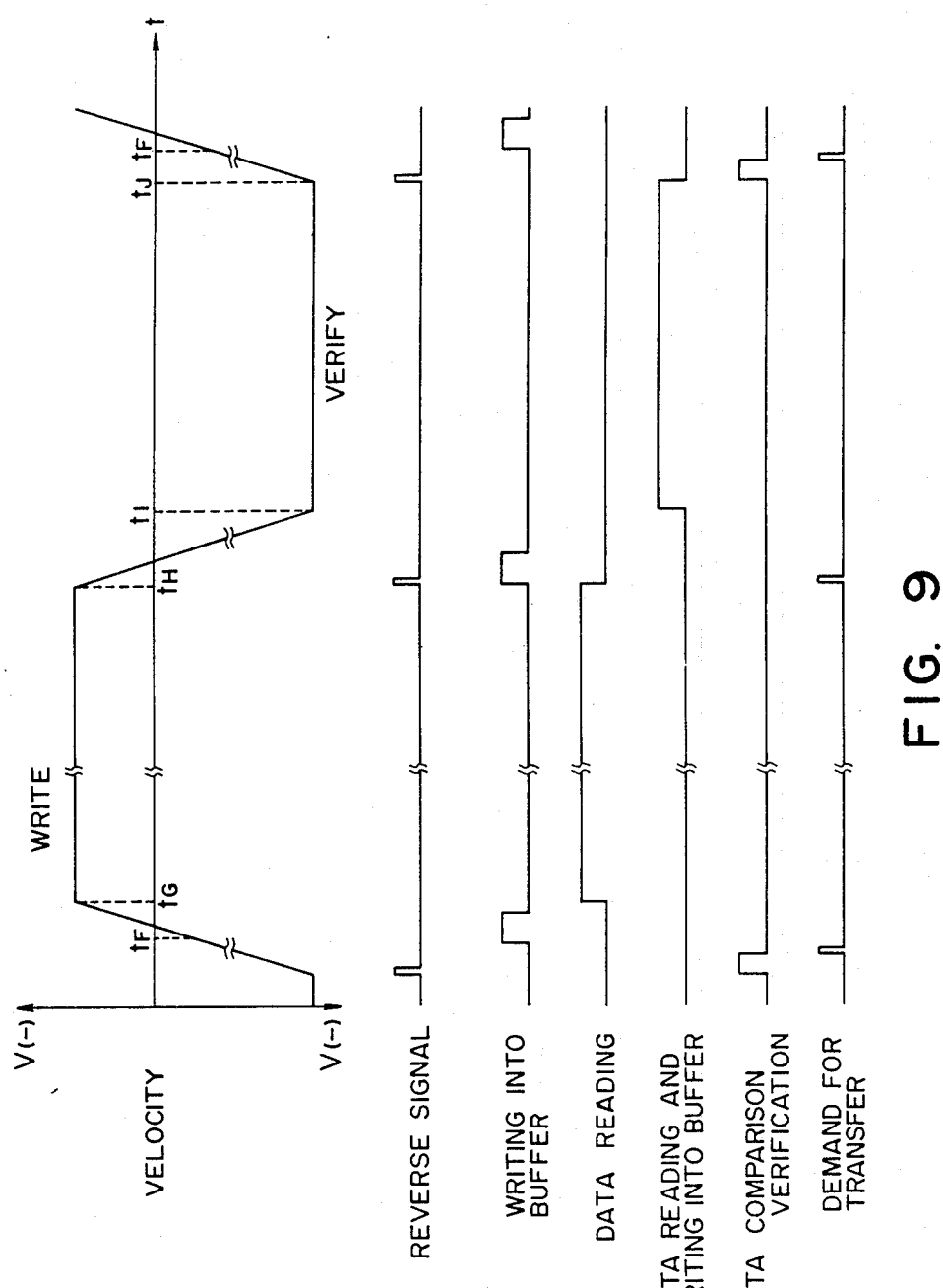
FIG. 9 is a time chart when data is recorded.

FIG. 9 is a timing chart showing the situation when data is recorded onto the optical card. First, a data transfer command is sent from the host side to the apparatus side. Subsequently, the data is transferred. The storage of this data in the buffer memory 111 is started (point $t_F$). At this time, the buffer memory and address counter are cleared. When the optical head reaches the recording area, the data is read out of the buffer memory synchronously with the recording speed and recorded onto the optical card (point $t_G$). In this case, the foregoing preamble data, sync mark, and postamble data are also recorded. After the optical head is out of the recording area and the writing of the data is finished, the same data as the data which has just been recorded is again transferred from the host side and stored in the buffer memory 111 (point $t_H$). When the optical card is returned and the optical head passes over the recording area, the data which has just been recorded onto the optical card is read out and stored into the buffer memory 101 (point $t_I$). The card feeding speed upon reading is very much higher than that upon recording. After the optical head is out of the recording area of the card and the reading of the data is finished, the content of the buffer memory 111 is compared with the content of the buffer memory 101. If they coincide, a signal indicative of demand for transfer is output and the data to be written onto the next track is transferred from the host side (point $t_J$). If they do not coincide, the same data is transferred again and recorded on the next track again. Since the data is written in reverse in the buffer memory 101, when the data is read out, the address counter is reduced and the data is read out in the correct direction.

Although the embodiment has been described with respect to the optical card, it can be also applied to a magnetic tape and a disc-shaped recording medium which is fed in a stepwise manner.

The present invention is not limited to the foregoing embodiment but many modifications and variations are possible within the spirit and scope of the appended claims of the invention.

An embodiment of a system including also the host side will now be described.

Figure 10:
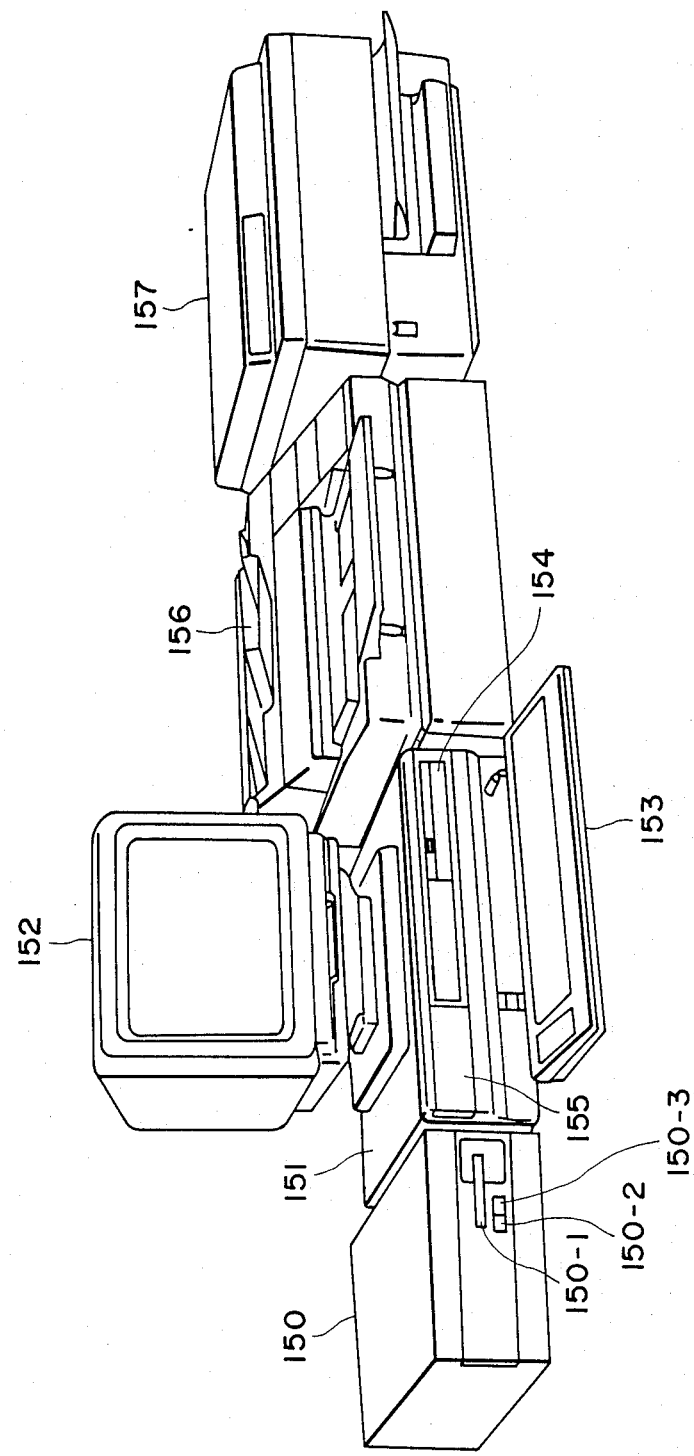
FIG. 10 is a perspective view showing the constitution of an information memory system to which the present invention can be applied.

FIG. 10 is an external view of the information memory system of the embodiment. Reference numeral 150 denotes a card reader/writer (hereinafter, referred to as a reader/writer) which has already been described in the foregoing embodiment; 150-1 is an inserting/ejecting port of the optical card; 150-2 a loading start switch to insert the optical card; 150-3 an ejection switch to eject the optical card; and 151 a host computer (hereinafter, referred to as a host) for controlling the whole system. For example, a personal computer or the like is used as the host 151. Numeral 152 denotes a display (hereinafter, referred to as a CRT) for displaying characters, images, and the like; 153 is a keyboard for inputting various commands and the like; 154 a floppy disk drive; and 155 a hard disk drive which is equipped in the host 151 and stores all of the information read out of the optical card; 156 an image reader for photoelectrically reading image data such as original and the like; and 157 a printer for printing characters, images, and the like. For example, a laser beam printer or the like is used as the printer 157.

Figure 11:
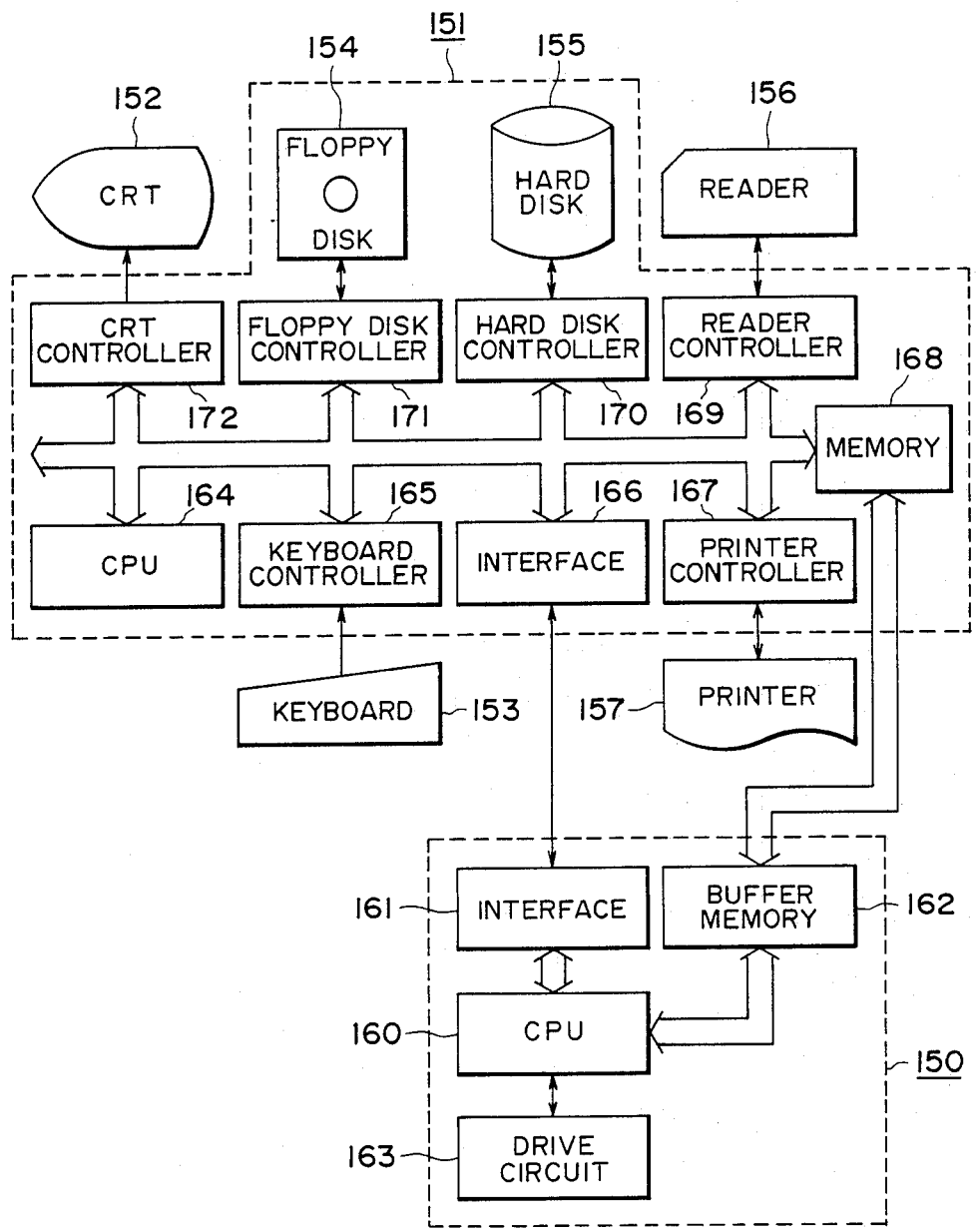
FIG. 11 is a block diagram showing the constitution of the system shown in FIG. 10.

FIG. 11 is a block diagram showing a constitution of the system shown in FIG. 10. The same parts and components as those shown in FIG. 10 are designated by the same reference numerals. Numeral 164 denotes a CPU for controlling the whole host 151; 165 is a keyboard controller for controlling the keyboard 153; 166 an interface for controlling the input/output data with the reader/writer 150; 167 a printer controller for controlling the printer 157; 168 a memory for temporarily storing the data and the like and serving as a work area of the CPU 164; 169 a reader controller for controlling the reader 156; 170 a hard disk controller for controlling the hard disk drive 155; 171 a floppy disk controller for controlling the floppy disk drive 154; and 172 a CRT controller for controlling the CRT 152. Numeral 160 denotes a CPU for controlling the reader/writer 150 and corresponds to the CPU 26 in FIG. 2; 161 is an interface for controlling the input/output data with the host 151 and corresponds to the interface 37 in FIG. 2; 162 a buffer memory and corresponds to the buffer memories 101, 102, and 111 in FIGS. 6 and 8; and 163 a drive circuit and corresponds to the circuits shown in FIG. 2. The details of the reader/writer 150 have previously been described above.

Figure 12A:
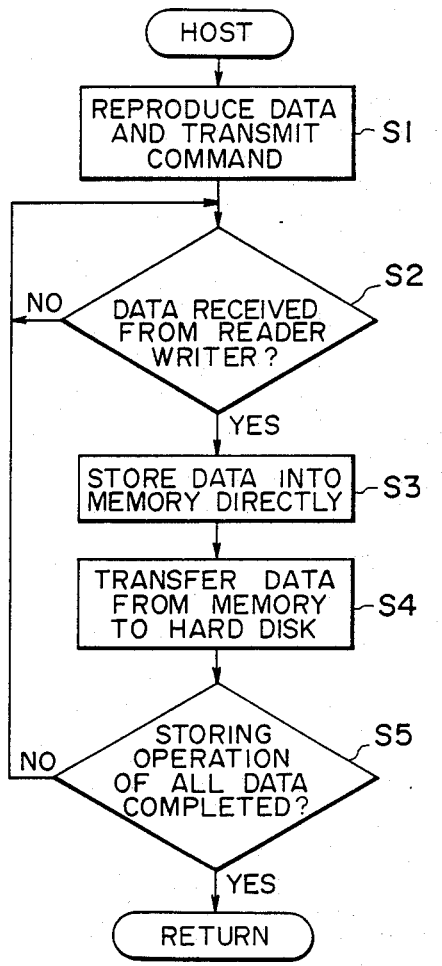
FIGS. 12A and 12B are flowcharts showing the data processing operations of a host computer and a reader/writer when the data is reproduced.
Figure 12B:
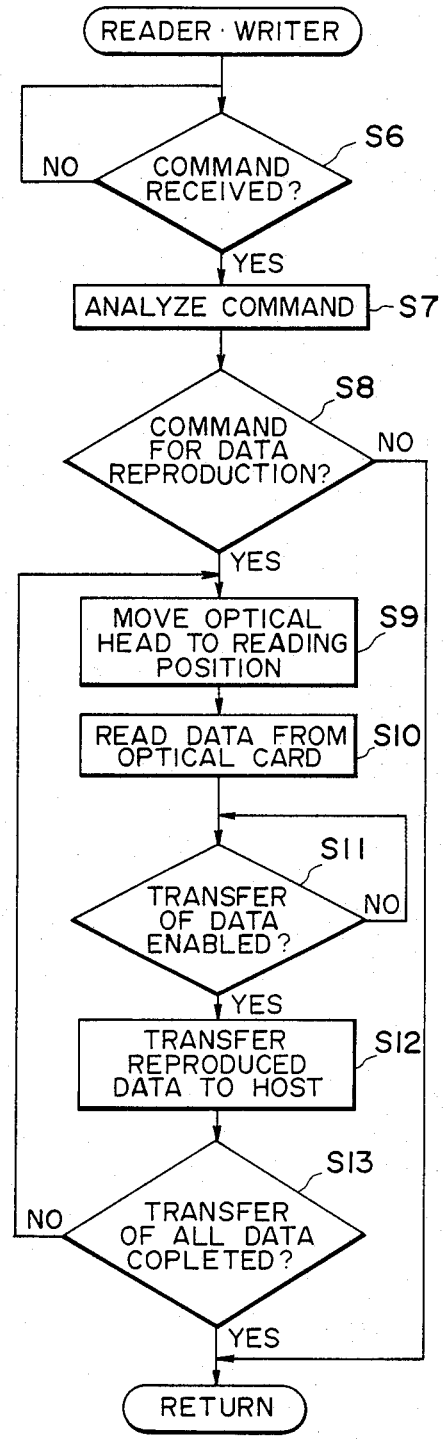
Figure 13:
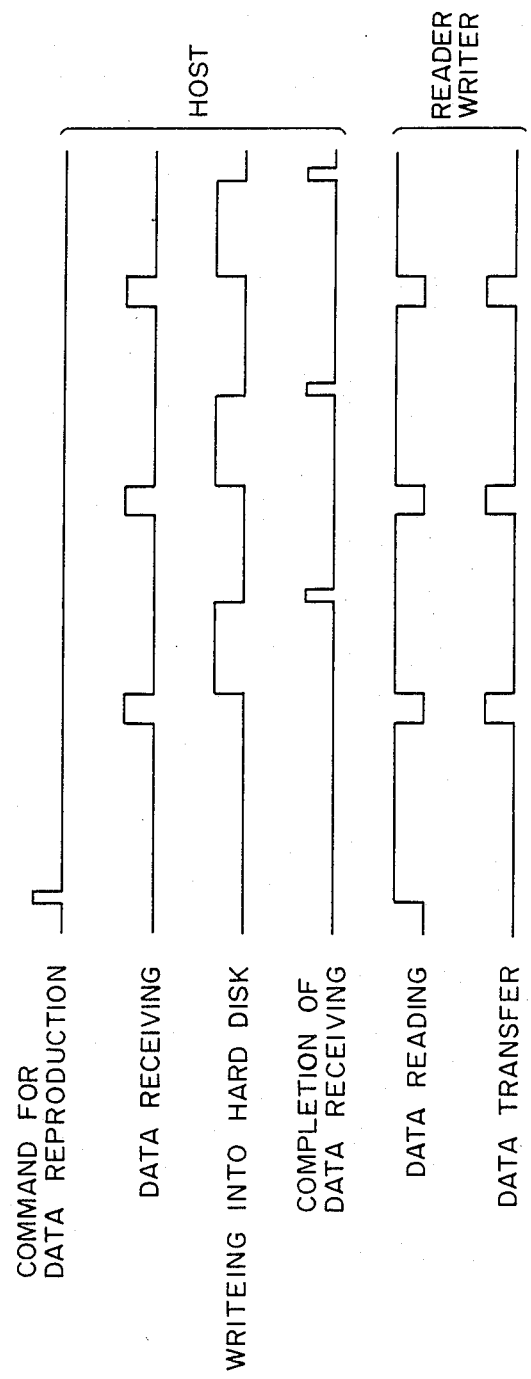
FIG. 13 is a time chart when the data is reproduced.

The data transfer between the reader/writer 150 and the host 151 will now be described with reference to FIGS. 12A, 12B, and 13. FIG. 12A is a flowchart showing the operation of the host side when the data is reproduced. FIG. 12B is a flowchart showing the operation of the reader/writer side. First, when the data is reproduced from the optical card, a command to instruct the reproduction of the data from the host 151 to the reader/writer 150 is generated (step 1). The reader/writer 150 receives the command from the host side and analyzes the content of the command (steps 6 and 7). If the command instructs the reproduction of the data, the optical head is positioned and moved to the reading position (steps 8 and 9). The recording track on the optical card is scanned to read out the data and the data is stored in the buffer memory 162 (step 10). A check is made to see if the data can be transferred to the host side or not by discriminating whether the DMA (dynamic memory access) is empty or not, and if it is empty, the data is directly transferred into the memory 168 on the host side (steps 11 and 12). The host side receives, the data from the reader/writer and stores it in the memory 168 (step 3). The data is transferred from the memory 168 to the hard disk 155 (step 4). In this case, the data is stored, in the hard disk 155 for the idle time of the host side when the data recorded onto the optical card is being read by the reader/writer (i.e., during the movement of the optical card at a constant speed). The reader/writer side repeats the foregoing processes until all of the data to be read out has been completely transferred (step 13). The host side also repeats the foregoing processes until all of the data has been completely transferred to the hard disk 155 (step 5). FIG. 13 shows a time chart for the above operations.

Figures 14A, 14B:
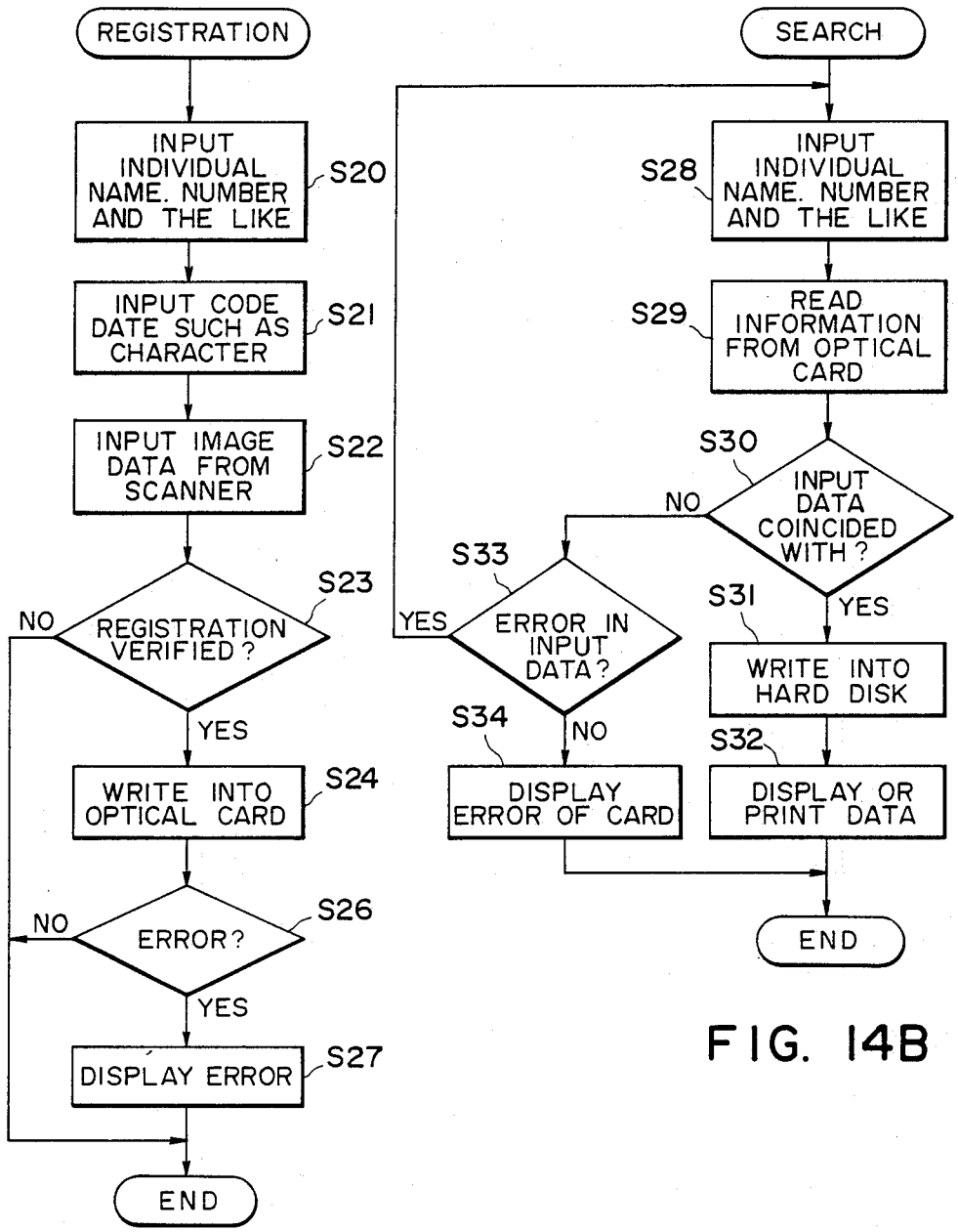
FIGS. 14A and 14B are flowcharts showing the operations to register and search the data.

The registration and search of the data by the foregoing system will now be simply explained with reference to FIGS. 14A and 14B. For example, the case where the information such as a patient's chart which is used in hospitals is recorded onto the card will now be explained. First, the name, identification number, and the like of the patient are input (step 20). The information such as the result of medical examination and the like is input from the keyboard (step 21). The image data such as photograph of the patient's face and the like is input from the image reader (step 22). The registration is verified to see if the writing of the data onto the optical card is proper or improper (step 23). If it is proper, the data is written onto the optical card (step 24). A check is then made to see if a writing error is detected because of the lack of memory capacity of the card, failure of the reader/writer, or the like or not (step 26). If the error is detected, the causes of the error are displayed (step 27).

Figure 15:
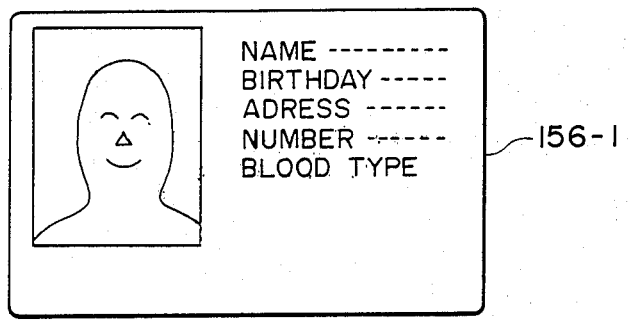
FIG. 15 is a diagram showing an example of display of the data.

To reproduce the information, the card of person to be searched is inserted and data of the name, identification number, and the like is input (step 28). The information is read out of the optical card (step 29). A check is made to see if the input data coincides with the read data or not, namely, the verification is made to see if the data is for the same person or not (step 30). If those data are not coincident, a check is made to see if an error is detected in the input data or not (step 33). If an error is detected, data is again input. If no error is detected, the insertion of the wrong card is displayed (step 34). If the input data coincides with the read data, the data recorded on the optical card is written to the hard disk (step 31) and the data is displayed or printed out (step 32). FIG. 15 shows an example of display of the data. Numeral 156-1 denotes a display surface of the CRT 156.

Although the embodiment has been described with respect to the optical card, the invention can be also applied to a magnetic tape or a disk-shaped recording medium which is fed in a stepwise manner.

As described above, the information read out of the recording medium can be efficiently transferred to the host side and can be processed. The information which has already been read out of the recording medium is stored in the auxiliary memory apparatus for the period of time when the next information is read out of the recording medium. Therefore, the idle time of the host side can be extremely effectively used.

The present invention is not limited to the foregoing embodiments but many modifications and variations are possible within the spirit and scope of the appended claims of the invention.

What is claimed is:

1. An information memory system comprising:
   moving means for reciprocating a recording medium;
   reading means for reading out information recorded in the recording medium, during motion of the recording medium;
   a buffer memory, for temporarily storing the information read out by said reading means;
   storing means, different from the recording medium, for storing information therein;
   a host computer for supervising said storing means and said reading means; and
   transfer means for transferring the information stored in said buffer memory to said host computer when the direction of movement of the recording medium is reversed,
   wherein said host computer causes the information transferred by said transfer means to be stored in said storing means while said reading means in reading out new information.

2. An information memory system according to claim 1, wherein said transfer means transfers the information while the recording medium is being accelerated or decelerated.

3. An information memory system according to claim 1, wherein said storing means comprises a magnetic hard disk.

4. An information memory system according to claim 1, wherein said recording medium is a card-shaped recording medium.

5. An information memory system according to claim 1, wherein said host computer includes a memory for storing the the information transferred by said transfer means, and wherein the information stored in said memory is stored in said buffer memory.

6. An information memory system according to claim 1, further comprising retrieving means for retrieving desired information stored in said storing means.

7. An information memory system according to claim 6, further comprising display means for displaying the information retrieved by said retrieving means.

8. An information memory system according to claim 6, wherein said retrieving means includes input means for inputting retrieving information for retrieving desired information, and wherein the retrieval operation is prohibited when the retrieving information inputted by said input means is not associated with the recording medium.

* * * * *

UNITED STATES PATENT AND TRADEMARK OFFICE
CERTIFICATE OF CORRECTION

PATENT NO. : 4,864,113

DATED : September 5, 1989

INVENTOR(S) : NOBUO OGURA

It is certified that error appears in the above-identified patent and that said Letters Patent is hereby corrected as shown below:

IN THE DRAWINGS,
SHEET 13 OF 13

FIG. 15, "ADRESS" should read --ADDRESS--.

COLUMN 3

Line 4, "arrows c and c'by" should read
        --arrows c and c' by--.

COLUMN 4

Line 2, "thereby to" should read --thereby allowing the data to be read out in the direction opposite to--.
    Line 45, "memory 5" should read --memory--.

COLUMN 6

Line 33, "receives," should read --receives--.

UNITED STATES PATENT AND TRADEMARK OFFICE
CERTIFICATE OF CORRECTION

PATENT NO. : 4,864,113

DATED : September 5, 1989

INVENTOR(S) : NOBUO OGURA

It is certified that error appears in the above-identified patent and that said Letters Patent is hereby corrected as shown below:

COLUMN 8

Line 11, "in" should read --is--.
Line 25, "the the" should read --the--.

Signed and Sealed this

Eleventh Day of August, 1992

Attest:

DOUGLAS B. COMER

*Attesting Officer*    *Acting Commissioner of Patents and Trademarks*